United States Patent
Kiss et al.

(10) Patent No.: US 10,800,865 B2
(45) Date of Patent: Oct. 13, 2020

(54) PROCESS FOR MAKING BRANCHED EPDM AND THE EPDM THEREFROM

(71) Applicant: ExxonMobil Chemical Patents Inc., Baytown, TX (US)

(72) Inventors: Gabor Kiss, Hampton, NJ (US); Jo Ann M. Canich, Houston, TX (US); Guy J. Wouters, Jambes (BE); Robert P. Reynolds, Jr., Clinton, NJ (US); Rainer Kolb, Kingwood, TX (US); David J. Lohse, New York, NY (US); Florin Barsan, Pearland, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 49 days.

(21) Appl. No.: 15/749,866

(22) PCT Filed: Aug. 17, 2016

(86) PCT No.: PCT/US2016/047399
§ 371 (c)(1),
(2) Date: Feb. 2, 2018

(87) PCT Pub. No.: WO2017/048448
PCT Pub. Date: Mar. 23, 2017

(65) Prior Publication Data
US 2018/0223022 A1      Aug. 9, 2018

Related U.S. Application Data (60) Provisional application No. 62/218,243, filed on Sep. 14, 2015.

(30) Foreign Application Priority Data

Oct. 30, 2015   (EP) .................................. 15192331

(51) Int. Cl.
*C08F 210/18*   (2006.01)
*C08F 4/659*    (2006.01)

(52) U.S. Cl.
CPC ........ *C08F 210/18* (2013.01); *C08F 4/65908* (2013.01); *C08F 4/65912* (2013.01)

(58) Field of Classification Search
CPC .................................................... C08F 210/18
See application file for complete search history.

(56) References Cited

U.S. PATENT DOCUMENTS

| 5,229,478 A | 7/1993 | Floyd et al. |
| 5,698,651 A | 12/1997 | Kawasaki et al. |

(Continued)

FOREIGN PATENT DOCUMENTS

| EP | 0 751 156 B | 9/2001 |
| EP | 2 221 323 A | 8/2010 |

(Continued)

*Primary Examiner* — Catherine S Branch (57) ABSTRACT

Branched ethylene-propylene-diene elastomers (bEPDM) and processes for making the bEPDM's comprising combining a catalyst precursor and an activator at a temperature within a range from 90° C. to 160° C. with ethylene, a C3 to C12 α-olefin, a non-conjugated diene, and a dual-polymerizable diene, where the catalyst precursor is a metallocene catalyst precursor, preferably according to one of various structures including any two ligands selected from cyclopentadienyl ligands and ligands isolobal to the cyclopentadienyl group.

8 Claims, 2 Drawing Sheets

(56) References Cited

U.S. PATENT DOCUMENTS

| | | | |
|---|---|---|---|
| 6,124,413 A | 9/2000 | Banzi et al. | |
| 6,147,025 A | 11/2000 | Gillis et al. | |
| 6,329,477 B1 | 12/2001 | Harrington et al. | |
| 6,545,088 B1 | 4/2003 | Kolthammer et al. | |
| 7,829,645 B2 | 11/2010 | Windmuller et al. | |
| 7,943,711 B2 * | 5/2011 | Ravishankar | C08F 210/18 |
| | | | 525/232 |
| 7,956,140 B2 | 6/2011 | Ijpeij et al. | |
| 8,013,082 B2 | 9/2011 | Ramage et al. | |
| 8,058,373 B2 | 11/2011 | Stevens et al. | |
| 8,962,761 B2 | 2/2015 | Tse | |
| 2014/0100325 A1 | 4/2014 | Burton et al. | |
| 2015/0087766 A1 | 3/2015 | Tang et al. | |

FOREIGN PATENT DOCUMENTS

| | | |
|---|---|---|
| JP | 0948823 A | 2/1997 |
| JP | H0948822 A | 2/1997 |
| JP | H0971616 A | 3/1997 |
| JP | 1160841 A | 3/1999 |
| JP | 3570790 B | 9/2004 |
| WO | 95/16716 A | 6/1995 |
| WO | 97/32946 A | 9/1997 |
| WO | 03/050148 A | 6/2003 |
| WO | 2008/095687 A | 8/2008 |
| WO | 2010/012587 A | 2/2010 |
| WO | 2011/002199 A | 1/2011 |

* cited by examiner

PROCESS FOR MAKING BRANCHED EPDM AND THE EPDM THEREFROM

CROSS-REFERENCE TO RELATED APPLICATIONS

This present application is a National Phase Application claiming priority to PCT Application Ser. No. PCT/US2016/047399 filed Aug. 17, 2016, and claims priority to U.S. Ser. No. 62/218,243, filed Sep. 14, 2015, and EP 15192331.5, filed Oct. 30, 2015, both all of which are herein incorporated by reference.

FIELD OF THE INVENTION

The present invention relates to methods to produce branched ethylene-propylene-diene interpolymers, and in particular to producing a branched ethylene-propylene-diene polymers (bEPDM) using a metallocene catalyst.

BACKGROUND OF THE INVENTION

There are well known advantages to using single-site catalysts to produce polyolefins. Current single-site catalysts, such as metallocenes, tend to produce linear polyolefins. This is true not only of simpler polyolefins, but also terpolymers and such as ethylene-propylene-diene elastomer (EPDM). At the same time, branched EPDMs such as those produced from conventional vanadium catalysts also have advantages. For example, vanadium catalysts can produce EPDMs with long-chain branches (LCBs) that are beneficial in certain applications due their effect on the melt rheology of the polymer. While processes using vanadium catalysts can produce EPDMs with the desired LCBs, these processes are costly due to the need for the removal of excessive amounts of catalysts residues, a process called deashing. Some single site catalysts can produce EPDMs at low concentrations eliminating the need for the costly deashing, but they do not yield EPDMs with the desired LCBs. Thus, for single-site EPDMs (EPDMs made by using single-site catalysts, or "mEPDM") to compete with conventional LCB EPDMs made with vanadium based catalysts, long chain branching is needed, especially for EPDM sponge grades. One such attempt to produce branched EPDM-type polymers is disclosed in EP 2221323 and EP 0751156. Branching can be achieved by using so called "dual-polymerizable dienes" such as 5-vinyl-2-norbornene or alpha-omega dienes, but it is often difficult to incorporate these monomers efficiently into the forming ethylene-propylene-diene polymer without overloading the monomers into the polymerization reactor, which can then result in stability problems with the EPDM thus generated. Therefore, an improved method is needed for making branched EPDMs using single-site catalysts.

Other references include U.S. Pat. No. 8,962,761; U.S. Pat. No. 8,058,373; U.S. Pat. No. 8,013,082; U.S. Pat. No. 7,956,140; U.S. Pat. No. 7,829,645; U.S. Pat. No. 6,545,088; U.S. Pat. No. 6,329,477; U.S. Pat. No. 6,124,413; U.S. Pat. No. 5,698,651; U.S. Pat. No. 5,229,478; EP 2115018; JP 11060841; JP 09048823; WO 2011/002199; WO 2010/012587; WO 97/032946; and WO 95/16716.

SUMMARY OF THE INVENTION

Disclosed is a process for making a branched ethylene-propylene-diene elastomer (bEPDM) comprising (or consisting essentially of) combining a catalyst precursor and an activator at a temperature within a range from 90, or 100, or 110° C. to 130, or 140, or 150, or 160° C. with ethylene, a C3 to C12 α-olefin, a non-conjugated diene, and a dual-polymerizable diene (DPD, preferably 5-vinyl-2-norbornene and C8-C12 alpha-omega linear dienes); where the catalyst precursor is selected from among various Group 4 metallocenes, preferably comprising any two ligands selected from cyclopentadienyl ligands and ligands isolobal to the cyclopentadienyl group.

Also disclosed is a branched ethylene-propylene-diene elastomer (bEPDM) comprising (or consisting essentially of, or consisting of) within the range from 35, or 40, or 45 wt % to 55, or 60, or 65 wt % ethylene derived monomer units; within the range from 2, or 4, or 6 wt % to 8, or 10, or 12 wt % of non-conjugated diene derived monomer units; and within the range from 0.060 mol % to 0.080 or 0.10 or 0.20 mol % dual-polymerizable diene derived monomer units; wherein the remainder of monomer derived units are a C3 to C12 α-olefin derived units, most preferably propylene derived units.

DETAILED DESCRIPTION OF THE INVENTION

The problems discussed above are solved at least in part by introducing small amounts of one or more dual-polymerizable dienes such as 5-vinyl-2-norbornene (VNB) or 1,7-octadiene, along with C2, C3 and ethylidene norbornene (ENB) to make a branched metallocene EPDM. Smaller amounts of dual-polymerizable diene (DPD) can be used under process conditions where the reactor pressures are preferably above 6 or 8 MPa and reactor temperatures are above 90 or 100° C. in combination with the catalysts of the current disclosure. Such branched EPDM polymers can be produced with lower levels of residual vinyl unsaturation which will improve storage stability while maintaining excellent curability.

The improved incorporation of DPD's such as VNB is demonstrated by the process satisfying the relationship [P-DPD]<0.244[M-DPD]+0.012, where [P-DPD] is the mol % of dual-polymerizable diene in the polymer as measured by $^{13}$C NMR preferably at the vinyl carbon atom(s), and [M-DPD] is the mol % dual-polymerizable diene monomer in the total monomer feed to the polymerization process, preferably the DPD is VNB and the [P-VNB] is as measured by $^{13}$C NMR using the $C_8$ and $C_9$ carbons on VNB. Thus, more preferably, the inventive process satisfies the relationship [P-VNB]<0.244[M-VNB]+0.012, where [P-VNB] is the mol % VNB in the polymer as measured by $^{13}$C NMR using the $C_8$ and $C_9$ carbons on VNB, and [M-VNB] is the mol % VNB monomer in the total monomer feed to the polymerization process. See the description in the Examples section below for a description of measuring [P-DPD] and/or [P-VNB] using $^{13}$C NMR.

These ends and others are achieved by a process for making a branched ethylene-propylene-diene elastomer (bEPDM) comprising (or consisting essentially of) combining a catalyst precursor and an activator at a temperature within a range from 90, or 100, or 110° C. to 130, or 140, or 150, or 160° C. with ethylene, a C3 to C12 α-olefin, a non-conjugated diene, and a dual-polymerizable diene (DPD). Alternatively, the temperature of some embodiments may be 100° C. or greater, or 105° C. or greater. In certain of those embodiments, the temperature may range up to 130, 140, 150, or 160° C. The catalyst precursor may be in accordance with one of the Group 4 (of the Periodic Table: Ti, Zr, Hf) metallocene structures denoted below, or, in certain embodiments, is selected from the group consisting of $C_s$-symmetric Group 4 ansa-metallocenes. The catalyst precursor according to various embodiments preferably comprises any two ligands selected from cyclopentadienyl ligands and ligands isolobal to the cyclopentadienyl group. In any embodiment, the "combining" (i.e., the coming together of components to effect a polymerization process) preferably takes place at a pressure of at least 6.0 or 8 MPa, or within a range from 6 or 8 MPa to 16 or 20 MPa. In certain embodiments, for instance in accordance with the Examples discussed herein below, the combining preferably takes place at a pressure of at least 11.3, 11.4, or 11.5 MPa, such as within the range from a low of any one of 11.3, 11.4, and 11.5 MPa to a high of any one of 16 and 20 MPa. In yet further embodiments, the combining may take place at a pressure of greater than 8 or 10 MPa, or within a range from 8 or 10 MPa to 16 or 20 MPa. In some embodiments, the pressure is greater than 10 MPa.

"Consisting essentially of" in the context of processes described herein means that no other chemical bond-transforming steps take place such as the addition of a peroxide or hydroperoxide to modify the polymer, the addition of multiple catalysts, such as an additional Group 4 metallocene, or other step that would form a chemically bonded graft to a backbone-polyolefin. The further blending of non-reactive additives such as thermoplastics, fillers, antioxidants and oil extenders is not precluded by the term "consisting essentially of". Similarly, when used in the context of a polymer composition, "consisting essentially of" is not meant to exclude components of a polymer composition resulting from blending non-reactive additives with the polymer.

"Isolobal" means radical molecules wherein the number, symmetry properties, approximate energy and shape of the frontier orbitals that participate in bonding to the Group 4 metal center, and the number of electrons in them, are similar or identical; preferably, "isolobal" ligands are those with a similar electronic bonding structure (ligand to metal) as C5-cyclopentadienyl anions. Non-limiting examples of ligands isolobal to the cyclopentadienyl group include indenyl, fluorenyl, cyclopenta[b]naphthalenyl, cyclopenta[a]naphthalenyl, cyclopenta[l]phenanthrenyl, cyclopenta[b]anthracenyl, cyclopenta[a]anthracenyl, indeno[1,2-b]anthracenyl, dibenzo[b,h]fluorenyl, benzo[b]fluorenyl, hydrogenated versions thereof (e.g., 4,5,6,7-tetrahydroindenyl, 1,2,3,4,5,6,7,8-octahydrofluorenyl), substituted versions thereof (e.g., 2,7-di-t-butylfluorenyl, 3,6-dimethylfluorenyl), and heterocyclic versions thereof (e.g., cyclopenta[b]thiophenyl, benzo[b]cyclopenta[d]thiophene).

"Substituted" versions thereof include those having alkyl and/or aryls bound to one or more positions along the rings, and "heterocyclic" versions thereof include rings having one or more carbons substituted by a heteroatom, preferably sulfur, nitrogen, oxygen, silicon and/or phosphorous. Most preferably, the catalyst precursor is a bis-cyclopentadienyl metallocene, in some cases $C_s$-symmetric, having any combination of two of the following: cyclopentadienyl, indenyl, fluorenyl, and substituted versions thereof. In some embodiments, the catalyst precursor is a bridged bis-cyclopentadienyl metallocene having one fluorenyl and one cyclopentadienyl ligand.

In any embodiment, at least one of the two cyclopentadienyl ligands of the catalyst precursor is mono- or di-substituted with groups selected from C1 to C12 alkyls, C3 to C16 isoalkyl (sec- and tert-), C6 to C24 aryls (including alkylaryls), C9 to C24 fused multi-ring aryls (e.g., naphthyl, fluorenyl), C5 to C20 nitrogen and/or sulfur containing heterocycles (e.g., N-carbazolyl), and combinations thereof. Most preferably, at least one of the two ligands is mono- or di-substituted with groups selected from iso-propyl, iso-butyl, tert-butyl, phenyl, alkylphenyl, and dialkylphenyl.

In any embodiment, the catalyst precursor is selected from $C_s$-symmetric ansa-metallocenes. Preferably, the bridging group comprises at least one phenyl group, alkyl substituted phenyl group, or alkylsilyl substituted phenyl group.

In yet further embodiments, the catalyst precursor is selected from the following structures:

and

-continued wherein:

M is a Group 4 metal, preferably zirconium or hafnium, most preferably hafnium;

Q is silicon or carbon;

R' and R" are each independently selected from phenyl, alkyl substituted phenyl, and alkylsilyl substituted phenyl, most preferably C1 to C5 alkylsilyl-p-phenyl (meaning a total of C7 to C12 when including the 6 carbons of the phenyl in the carbon number count), such as trialkylsilyl-p-phenyl.

each X is independently selected from C1 to C10 alkyls, phenyls, and halogens (or, in some embodiments, C6 to C14 alkylphenyls);

each of $R^1$ to $R^8$ is independently selected from hydrogen, C1 to C10 alkyls, phenyls, and alkylphenyls (in some embodiments, C7 to C14 alkylphenyls); in certain embodiments, $R^1$, $R^3$ to $R^6$, and $R^8$ are hydrogen and the $R^2$ and $R^7$ groups are selected from iso-propyl, iso-butyl, tert-butyl, phenyl, alkylphenyl, and dialkylphenyl; in yet further embodiments, any one or more of $R^1$ to $R^8$ may instead be C5 to C20 nitrogen and/or sulfur containing heterocycles; and each of $R^{1'}$ to $R^{6'}$ is independently selected from hydrogen, C1 to C10 alkyls, and phenyls.

In any embodiment, the catalyst precursor is most preferably selected from the following structure:

wherein:

M is a Group 4 metal, preferably zirconium or hafnium, most preferably hafnium;

Q is silicon or carbon;

R' and R" are each independently selected from phenyl, alkyl substituted phenyl, and alkylsilyl substituted phenyl, most preferably C1 to C5 alkylsilyl-p-phenyl (meaning a total of C7 to C12 when including the 6 carbons of the phenyl in the carbon number count), such as trialkylsilyl-p-phenyl;

each X is independently selected from C1 to C10 alkyls, phenyls, and halogens;

each of $R^1$ to $R^8$ is independently selected from hydrogen, C1 to C10 alkyls, phenyls, and alkylphenyls (in some embodiments, C6 to C14 alkylphenyls); most preferably $R^1$, $R^3$ to $R^6$, and $R^8$ are each hydrogen and the $R^2$ and $R^7$ groups are selected from iso-propyl, iso-butyl, tert-butyl, phenyl, alkylphenyl, and dialkylphenyl; in some embodiments, any one or more of $R^1$ to $R^8$ may instead be C5 to C20 nitrogen and/or sulfur containing heterocycles; and each of $R^{1'}$ to $R^{4'}$ is independently selected from hydrogen, C1 to C10 alkyls, and phenyls (preferably, $R^{1'}$ to $R^{4'}$ are each hydrogen). In some embodiments, $R^2$ and $R^7$ are each tert-butyl, $R^1$, $R^3$ to $R^6$, and $R^8$ are each hydrogen, $R^{1'}$ to $R^{4'}$ are each hydrogen, Q is silicon, and R' and R" are each triethylsilyl-p-phenyl.

In any embodiment, the "activator" comprises any compound capable of converting the catalyst precursor into an active polymerization catalyst, and preferably includes alkyl alumoxane compounds (e.g., methylalumoxane) and/or tetra (perfluorinated aromatic)borates, but more preferably, comprises tetra(perfluorinated aromatic)borates. Even more preferably, the activator comprises anions selected from tetra(pentafluorophenyl)borate, tetra(perfluorobiphenyl)borate, tetra(perfluoronaphthyl)borate, and combinations thereof. In the case of anionic activators, the activator also comprises a bulky organic cation (trialkyl ammonium, trialkylmethyl, trialkylphosphonium), preferably dialkylanilinium cation, or triphenylmethyl cation.

In any embodiment, the "dual-polymerizable dienes" are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); and more preferably from non-conjugated vinyl norbornenes and C8-C12 alpha-omega linear dienes (e.g., 1,7-heptadiene and 1,9-decadiene), and is most preferably 5-vinyl-2-norbornene. In any embodiment, the mol percent of the dual-polymerizable diene that is combined (i.e., present in the feed leading to the polymerization reactor) is less than 0.30, or 0.28, or 0.26 mol % relative to the other monomers, or within a range from 0.05 to 0.26 or 0.28 or 0.30 mol %. The bEPDM formed therefrom comprise "dual-polymerizable diene derived monomer units". In yet further embodiments, the mol percent of dual-polymerizable diene that is present in the feed leading to the polymerization reactor is less than 0.20, or 0.18, or 0.15, or 0.10 mol % relative to the other monomers, or within a range from 0.05 to 0.10 or 0.15 or 0.20 or 0.25 mol %.

In any embodiment, the "non-conjugated diene" in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. More preferably, the non-conjugated diene is selected from C7 to C30 cyclic non-conjugated dienes. Most preferably the non-conjugated diene is 5-ethylidene-2-norbornene. The bEPDM formed therefrom comprise "non-conjugated diene derived monomer units".

The various monomers and catalyst precursor and activators are preferably combined in a polymerization reactor where they are allowed to react at the desired monomer concentrations, catalyst concentrations, temperature and pressure. In any embodiment, the contacting takes place in a polymerization reactor having an inlet for the monomer and/or catalyst feeds, and an outlet for the effluent of the polymerization reaction, wherein the amount of bEPDM in the effluent is within a range from 2 or 4 or 6 wt % to 12 or 14 or 16 or 20 wt % based on the weight of the components in the solvent of the effluent stream. In some embodiments, the amount of bEPDM in the effluent is within a range from 3 to 12 wt %. The polymerization reaction may be any type of polymerization useful in forming polyolefins such as so-called gas phase reactions, solution reaction or slurry reactions, preferably continuous solution, slurry or gas phase reactions, most preferably continuous solution reactions.

In any embodiment, the bEPDM is made in what is commonly known as a "solution" process. For example, copolymerizations are desirably carried out in one or more single-phase, liquid-filled, stirred tank reactor with continuous flow of feeds to the system and continuous withdrawal of products under steady state conditions. When more than one reactor is used, the reactors may be operated in a serial or parallel configuration making essentially the same or different polymer components. Advantageously, the reactors would produce polymers with different properties, such as different molecular weights, or different monomer compositions, or different levels of long-chain branching, or any combinations thereof. All polymerizations can be performed in a system with a solvent comprising any one or more of C4 to C12 alkanes, using soluble metallocene catalysts or other single-site catalysts and discrete, non-coordinating borate anion as co-catalysts. A homogeneous dilute solution of tri-n-octyl aluminum or other aluminum alkyl in a suitable solvent may be used as a scavenger in concentrations appropriate to maintain reaction. Chain transfer agents, such as hydrogen, can be added to control molecular weight. Polymerizations can be at high temperatures described above and high conversions to maximize macromer re-insertions that create long chain branching, if so desired. This combination of a homogeneous, continuous, solution process helped to ensure that the products had narrow composition and sequence distributions.

In any embodiment the contacting (or polymerization) takes place in two stages or two reactors to produce two bEPDMs that are combined in situ or ex situ, each bEPDM having any one or more properties that are distinct such as different weight average molecular weights, and/or different levels of short and/or long chain branching. For instance, the polymer produced in the first reactor or stage may have a Branching Index (Bi) of 2 to 4, and in the second reactor or stage it may be 5 to 7. As described above, when more than one reactor is used, the reactors may be operated in a serial or parallel configuration making essentially the same or different polymer components.

In any embodiment, the reactor(s) can be maintained at a pressure in excess of the vapor pressure of the reactant mixture to keep the reactants in the liquid phase. In this manner the reactors can be operated liquid-full in a homogeneous single phase. Ethylene and propylene feeds (as well as the dienes) can be combined into one stream and then mixed with a pre-chilled hexane stream. A solution of a tri-n-octyl aluminum or other aluminum alkyl scavenger in a desirable solvent may be added to the combined solvent and monomer stream just before it entered the reactor to further reduce the concentration of any catalyst poisons. A mixture of the catalyst components (catalyst precursor and/or activator) in solvent may be pumped separately to the reactor and entered through a separate port. In another embodiment, cooled isothermal reactors can be used that do not require feed chilling.

The reaction mixture may be stirred aggressively by any means known in the art to provide thorough mixing over a broad range of solution viscosities. Flow rates can be set to maintain an average residence time in the reactor of 5 to 10 or 20 mins. On exiting the reactor the copolymer mixture may be subjected to quenching, a series of concentration steps, heat and vacuum stripping and pelletization, or alternatively, may be fed to a subsequent reactor where propylene will be polymerized, or fed to a line containing solution or slurry (or a combination of both) polypropylene where intimate mixing may occur. Water or water/alcohol mixture is then supplied to quench the polymerization reaction, which might otherwise continue in the presence of surviving catalyst, unreacted monomer, and elevated temperature. Antioxidant can be also used to quench the polymerization reaction.

To achieve the desired branching of the forming EPDM terpolymer a diene with at least two polymerizable double bonds can used. The diene can be incorporated into a polymer chain through one polymerizable bond in a similar manner as the incorporation of commonly used comonomers such as 1-hexene and 1-octene or norbornene. Each first insertion of the diene into a growing polymer chain produces a free vinyl group. These reactive polymer chains can be then incorporated into another growing polymer chain during polymerization through the second dangling double bond of a diene. This doubly inserted diene creates a linkage between two polymer chains and leads to branched structures.

The bEPDM can be recovered from the effluent of either the first polymerization step or the second polymerization step by separating the polymer from other constituents of the effluent using conventional separation means. For example, polymer can be recovered from either effluent by coagulation with a non-solvent, such as methanol, isopropyl alcohol, acetone, or n-butyl alcohol, or the polymer can be recovered by stripping the solvent or other media with heat or steam. After removal of solvent and monomer, pelletized polymer can be removed from the plant for physical blending with polypropylene. If in situ blends are preferred, the removal of solvent takes place after intimate mixing with the solution or slurry phase polypropylene.

The lean phase and volatiles removed downstream of the liquid phase separation can be recycled to be part of the polymerization feed. In the process, a degree of separation and purification takes place to remove polar impurities or internally saturated olefins that might undermine the activity of the catalyst. Otherwise any internally unsaturated olefins, which are difficult to polymerize would gradually build up in the lean phase and recycle streams. Any adverse effects on the polymerization activity, may be mitigated by removing these olefins from the recycle stream and/or encouraging their incorporation in the polymer, favored by high polymerization temperatures. Such methods are well known in the art.

Further, since the processes according to some embodiments employ metallocene rather than conventional vanadium catalysts, in processes according to such embodiments, the bEPDM is not washed for catalyst system residue (catalyst precursor and/or activator) removal in a finishing step.

The resulting bEPDM preferably comprises within the range from 35, or 40, or 45 wt % to 55, or 60, or 65 wt % ethylene derived monomer units; within the range from 2, or 4, or 6 wt % to 8, or 10, or 12 wt % of non-conjugated diene derived monomer units; and within the range from 0.060 mol % to 0.080 or 0.10 or 0.20 mol % dual-polymerizable diene derived monomer units; wherein the remainder of monomer derived units are a C3 to C12 α-olefin derived units, preferably propylene, 1-butene or 1-hexene derived monomer units, and most preferably propylene derived monomer units. In some embodiments, the bEPDM may comprise within the range from 0.010 mol % to 0.020 or 0.03 or 0.04 or 0.05 or 0.06 or 0.08 or 0.10 or 0.20 mol % dual-polymerizable diene derived monomer units; alternatively, the bEPDM may comprise less than 0.10 mol %, more preferably less than 0.08 mol %, even more preferably less than 0.06 mol % dual-polymerizable diene derived monomer units.

The bEPDM has many desirable features. In any embodiment, the bEPDM has a branching index (Bi) within the range from 4 or 6 to 8 or 10 or 12. Also in any embodiment the bEPDM has an uncured Mooney MLRA (1+4 at 125° C.) within the range from 500 or 600 or 700 MU to 1200 or 1400 or 1600 MU. Also, in any embodiment, the bEPDM has an uncured Mooney Viscosity ML (1+4 at 125° C.) of less than 140 or 120 or 100 or 98 or 95 MU, or within the range from 40 or 50 MU to 75 or 85 or 95 or 98 or 100 or 120 or 140 MU. Also, in any embodiment, the bEPDM has a compound Mooney Viscosity ML (1+4 at 125° C.) within the range from 65 or 68 MU to 72 or 84 MU. Finally, in any embodiment, the bEPDM has less than 2.0, or 1.8, or 1.6, or 1.4, or 1.2 mol % propylene regio-errors by $^{13}$C NMR. Or, the bEPDM may have less than 1.9 mol % propylene regio-errors, in some embodiments.

In any embodiment, the bEPDM produced herein is combined with one or more additional polymers prior to being formed into a film, molded part or other article. Other useful polymers include polyethylene (LDPE, LLDPE, HDPE), isotactic polypropylene, highly isotactic polypropylene, syndiotactic polypropylene, random copolymer of propylene and ethylene, and/or butene, and/or hexene, polybutene, polyisobutylene, ethylene vinyl acetate, ethylene methyl acrylate, copolymers of acrylic acid, polymethylmethacrylate or any other polymers polymerizable by a high-pressure free radical process, polyvinylchloride, ABS resins, ethylene-propylene rubber (EPR), vulcanized EPR, other EPDMs; polystyrene and styrenic block copolymers such as SES, SBS, SE/PS, SIS, etc.; polyamides, polycarbonates, PET resins, cross-linked polyethylene, copolymers of ethylene and vinyl alcohol (EVOH), poly-1-esters, poly-acetal, polyvinylidine fluoride, and polyethylene glycols.

The inventive bEPDM by itself in a blend may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired.

Such additives are well known in the art, and can include, for example: fillers; antioxidants (e.g., hindered phenolics such as Irganox™ 1010 or 1076 available from Ciba-Geigy); phosphites (e.g., Irgafos™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; radical stabilizers such as vitamin E, heat stabilizers; anti-blocking agents; release agents; anti-static agents; pigments; colorants; dyes; waxes; silica; fillers; talc; and the like.

The inventive bEPDMs may be useful in any number of applications such as rubber profiles (like automotive solid and sponge profiles, building profiles), hoses, mechanical goods, films (cast and/or blown) and sheets of material, such as for roofing applications, as well as thermoformed articles, blow molded articles, rotomolded articles, and injection molded articles. Particularly desirable end uses include automotive components and gaskets. Any of these articles may be foamed articles which are formed by means known in the art. Foamed or not, some specific uses of the inventive bEPDM include weather stripping, heat insulation, opening trim, and car trunk or car hood seals.

The various descriptive elements and numerical ranges disclosed herein for the inventive process and bEPDM therefrom can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Preparation of Amorphous (Low Crystallinity) Propylene-Based Copolymers

Catalyst System for Demonstrating Certain Process and Product Embodiments of the Present Disclosure:

The catalyst precursor was bis((4-triethylsilyl)phenyl)-methylene(cyclopentadienyl)(2,7-di-tert-butyl-fluoren-9-yl) hafnium dimethyl, also referred to as $C_s$-Cp(Hf)-Me$_2$. The activator was dimethylanilinium tetrakis(pentafluorophenyl) borate.

Catalyst System for Comparative Examples:

The catalyst precursor was [N-(1,1-dimethylethyl)-1,1-dimethyl-1-[1,2,3,3A,8A-η]-1,5,6,7-tetrahydro-2-methyl-S-indacene-1-yl]silaneaminate(2-)ƙN ] [dimethyl], also referred to as Mono-Cp(Ti)—(CH$_3$)$_2$. The activator was triphenylcarbenium-tetrakis(pentafluorophenyl)borate.

Also, as a comparative example is experimental data taken from EP 2 221 323 B1, using as a metallocene catalyst precursor [N-(1,1-dimethylethyl)-1,1-dimethyl-1-[1,2,3,3A,8A-η]-1,5,6,7-tetrahydro-2-methyl-S-indacene-1-yl]sila-neaminate(2-)ƙN ] [(1,2,3,4-η)-1,3-pentadiene], also referred to as Mono-Cp(Ti)—C5, with triphenylcarbenium-tetrakis(pentafluorophenyl)borate as the activator.

Polymerizations

Polymerization experiments were performed in a continuous stirred tank reactor (CSTR) made by Autoclave Engineers, Erie Pa. The reactor was designed to operate at a maximum pressure and temperature of 2000 bar (30 kpsi) and 225° C., respectively, although in the current experiments the nominal reactor pressures were lower, from 1550 to 1725 psig (10.7 to 11.9 MPa gauge). The nominal reactor vessel volume was 150 mL. The reactor was equipped with a magnetically coupled stirrer drive (Magnedrive). A pressure transducer measured the pressure in the reactor. The reactor temperature was measured using a type-K thermocouple. A flush-mounted rupture disk located on the side of the reactor provided protection against catastrophic pressure failure. All product lines were heated to 120° C. to prevent fouling. The reactor had an electric heating band that was controlled by a programmable logic control device (PLC). Except for the heat losses to the environment (which was to a large extent compensated for by the electric band heater), the reactor did not have cooling resulting in a nearly adiabatic operation.

The conversion in the reactor was monitored by an on-line gas chromatograph (GC) that sampled the monomer feed and the effluent gas phase. The GC analysis utilized the propane impurity present in the propylene feed as internal standard. The reactor temperature and the temperature difference across the reactor wall was maintained constant by adjusting the reactor heater output (skin temperature) and the catalyst feed rate. Depending on the product target and catalyst used, the target reactor temperature was maintained at 0.2-1.5 mol ppm catalyst concentrations in the feed. The activator was typically used in 10-40% mol excess (activator/precursor of 1.1-1.4 mol/mol). At these low catalyst concentrations, impurity control was the most critical factor in achieving controlled, steady state reactor conditions. Feed purification traps were used to control impurities carried by the monomer feed. The purification traps were placed right before the feed pumps and comprised of two separate beds in series: activated copper (reduced in flowing $H_2$ at 225° C. and 1 bar) for $O_2$ removal followed by a molecular sieve (5A, activated in flowing $N_2$ at 270° C.) for water removal.

Polymerization grade liquid propylene (gr. 2.0, Air Gas) was fed from a low-pressure cylinder equipped with a dip leg for liquid delivery to the reactor. A heating blanket (Ace Glass, Inc. Vineland, N.J.) was used to increase the propylene cylinder head pressure to 17 bar (250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The purified monomer feed was fed by a two-barrel continuous ISCO pump (model 500D). The monomer flow rate was adjusted by adjusting the motor speed of the pump and was measured by a Coriolis mass flow meter (Model PROline Promass 80, Endress and Hauser).

Deareated dienes feeds were purified in an argon-filled glove box by filtering through activated basic alumina. These feeds typically comprised of ethylidene norbornene (ENB) and a second diene with two polymerizable double bonds, like vinylidene norbornene (VNB), or alpha-omega dienes. The two diene components were blended in a 4 L heavy-walled glass reservoir (Ace Glass, Inc.). The reservoir was then pressurized to 5 psig with argon to deliver the blend to the diene feed pump (single-barrel ISCO 500D).

The catalyst feed solution was prepared inside an argon-filled dry box (Vacuum Atmospheres) dedicated solely to catalyst preparation. The atmosphere in the glove box was purified to maintain less than 1 ppm $O_2$ and less than 1 ppm water. All glassware was oven-dried for a minimum of 4 hours at 110° C. and transferred hot to the antechamber of the dry box. Stock solutions of the catalyst precursor and the activator were prepared using purified toluene that was stored in amber bottles inside the dry box. Aliquots were taken to prepare fresh activated catalyst solutions. The activated catalyst solution was charged inside the argon-filled dry box to a heavy-walled glass reservoir (Ace Glass, Inc.) and was pressurized to 5 psig with argon. The activated catalyst solution was delivered to the unit by a custom made two-barrel continuous high-pressure syringe pump (PDC Machines).

HPLC grade hexane (95% n-hexane, J. T. Baker) was used as solvent. It was purged with nitrogen for a minimum of four hours then passed through a series of Cu and mol sieve beds (similar to the ones used for the propylene feed, see above) and finally was filtered once over activated basic alumina. The filtered hexane was stored in a 4-liter glass vessel (Ace Glass, Inc.) inside an argon-filled dry box. The hexane was further purified by adding 1.5 mL (1.05 g) of trioctylaluminum solution (Aldrich No. 38,655-3) to the 4-liter reservoir of filtered hexane. 5-10 psig head pressure of argon was applied to the glass vessel to deliver the scavenger-treated solvent to a metal feed vessel from which the hexane was delivered to the reactor by a two-barrel continuous ISCO pump (model 500D).

Polymerization grade ethylene (gr. 4.5, Air Gas) was passed through the copper and mol sieve beds, was compressed by a Fluitron A %-200 compressor, and metered by a Brooks mass flow meter into the reactor.

During a polymerization experiment, the reactor was preheated to 10-15° C. below that of the desired reaction temperature. Once the reactor reached the preheat temperature, the solvent pump was turned on to deliver hexane/trioctylaluminum scavenger solution to the reactor from the 4-liter scavenger solution feed vessel. This stream of scavenger/catalyst solution entered the reactor through a port on the top of the stirrer assembly to keep the polymer from fouling the stirrer drive. After the flow of solvent to the reactor was verified by monitoring the amount of solvent taken from the feed vessel, the monomer feeds were turned on. The monomers were fed to the reactor through a side port. The reactor was purged when the pressure increased to 100 bar (1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (400 psi), an air actuated solenoid valve was opened to allow the catalyst solution to mix with the stream of flowing solvent upstream of the reactor. The arrival of the catalyst to the reactor was indicated by an increase in the reaction temperature caused by the exothermic polymerization reaction. During the line-out period, the catalyst feed rate was adjusted to reach and maintain the target reaction temperature and conversion.

Once the reactor conditions stabilized (lined out) at the desired conditions, the reactor effluent was sent to a dedicated product collection vessel for a given (on-balance) time period during which all flows were constantly recorded. The product collection vessel contained a solution of isopropyl alcohol for catalyst killing and antioxidants for product stabilization. The time-integrated flows during product collection were used to establish the total on-balance feed masses and moles for each feed component. The polymeric products were collected and weighed after vacuum-drying overnight at 70° C. Aliquots of the product were used for characterization without homogenizing the entire on-balance product yield.

Melt rheology of the products was characterized using a Mooney protocol following ISO 289. For the "Mitsui" Mooney Viscosity data in Table 3, these had to be converted from 160° C. measurements to 125° C. measurements for comparison by the relationship $ML_{125° C.} = 1.39 \cdot ML_{160° C.}$.

Unless measured by $^{13}$C NMR, The ethylene content of the polymers was measured using infrared spectroscopy following ASTM method D 3900-05a, "Standard Test Methods for Rubber-Determination of Ethylene Units in Ethylene-Propylene Copolymers (EPM) and in Ethylene-Propylene-Diene Terpolymers (EPDM) by Infrared Spectroscopy".

Unless measured by $^{13}$C NMR, The ENB content of the products was determined by using infrared spectroscopy following ASTM method D 6047-99 (Reapproved 2003), "Standard Test Methods for Rubber, Raw-Determination of 5-Ethylidenenorbornene (ENB) or Dicyclopentadiene (DCPD) in Ethylene-Propylene-Diene (EPDM) Terpolymers". Product VNB concentrations were below the measurable limits by infrared. Unless VNB concentrations were directly measured by $^{13}$C NMR, the reported VNB concentration values were estimated by assuming that the reactivity of ENB and VNB are equal and thus the ENB/VNB ratios in the feed and product were also equal.

Unless measured directly by $^{13}$C NMR, the propylene contents of the products were taken as the balances over the ethylene, ENB, and VNB contents.

The VNB and ENB contents of the polymers of examples series "M" reported in Table 2 are calculated from the data of table 1 of the Mitsui patent EP 2221323.

The VNB and ENB content of the polymers of examples series "C" and "E" in Table 2 were determined by $^{13}$C NMR using a Bruker 600 MHz NMR spectrometer equipped with a cryoprobe in CDCl$_3$ at 40° C. (using the solvent peak at 77 ppm as internal reference). Trichlorobenzene (TCB) containing one drop of deuterobenzene as internal lock may be used as an alternative solvent (with temperature at 150° C., and using the peak at 30 ppm as reference); however, to the extent results in CDCl$_3$ and TCB conflict, results from use of CDCl$_3$ should be used. The peaks of the C8 and C9 of the copolymerized VNB molecule are integrated in either method, as are the peak of the C2 and C8 of the copolymerized ENB molecule, with carbon numbers assigned per the following:

VNB ENB where the approximate chemical shifts are as follows:
In CDCl$_3$: VNB C8 at 144.6 and 141.7 ppm, and C9 at 114 and 111.2 ppm. ENB C2 at 147 and 145 ppm, and C8 at 112 and 110 ppm;
In TCB: VNB C8 at 144.6 and 141.7 ppm, and C9 at 114.2 and 110.7 ppm. ENB C2 at 147 and 145 ppm, and C8 at 112 and 110 ppm.

All samples herein were measured in CDCl3. Typically, a sample (~0.2 g) was placed in a vial followed by ~3.3 g of Deuterated Chloroform (CDCl3). The vial is capped and placed in a shaker-oven at 40° C. for several hours. Once dissolved the sample is poured into 10 mm tube. The 13C NMR spectra were recorded at 150 MHz at 40° C. using a zgpg pulse sequence with an acquisition time of 2 sec, D1 of 23 sec and NS of 1280 scans. The spectra referenced to the CDCl3 peak at 77 ppm.

The propylene regio-errors in the propylene continuous segments of the products may be determined using $^{13}$C NMR as described in U.S. Pat. No. 7,910,679, in which 1,1,2,2,-tetrachloroethane-d$_2$ (TCE) was used as solvent. Other solvents may be used, with the caveat that peak assignments discussed in U.S. Pat. No. 7,910,679 should be adjusted accordingly to accommodate the different solvent (and accompanying different chemical shift ranges).

Alternatively, propylene regio-errors may be determined using $^{13}$C NMR with a TCB solvent containing one drop of deuterobenzene at 125° C. The integrals (e.g., area under each peak) of peaks in each of the following chemical shift ranges are determined: (1) 55-35.3 ppm; (2) 35.3-34.4 ppm; (3) 34.4-28 ppm; (4) 27.98-27.88 ppm; and (5) 27.88-13 ppm. The areas (2) and (4), corresponding to 35.3-34.4 ppm peak range (alpha-beta carbons) and 27.98-27.88 ppm peak range (beta-gamma carbons), respectively, are summed, and then divided by the sum of peak areas (1)-(5). Multiplying by 100 gives mol % of the propylene regio-errors. Where conflicting results are obtained between the methods of (i) U.S. Pat. No. 7,910,679 vs. (ii) the TCB solvent-based method just described, the TCB solvent-based method will govern.

TABLE 1

Sample Identity and Reaction Conditions

| Ex. | Catalyst Precursor | Temp. (° C.) | Press. (MPa) | Feed ethylene (wt %) | Feed propylene (wt %) | Feed ENB (wt %) | Feed VNB (wt %) |
|---|---|---|---|---|---|---|---|
| | | Mitsui EP 2221323 | | | | | |
| M1 | Mono-Cp(Ti)-C5 | 80 | 0.8 | 3.10 | 4.60 | 1.40 | 0.11 |
| M2 | Mono-Cp(Ti)-C5 | 80 | 0.8 | 4.41 | 5.60 | 2.00 | 0.13 |
| M3 | Mono-Cp(Ti)-C5 | 80 | 0.8 | 3.97 | 5.91 | 1.79 | 0.09 |
| M4 | Mono-Cp(Ti)-C5 | 80 | 0.8 | 5.40 | 8.40 | 1.90 | 0.09 |
| M5 | Mono-Cp(Ti)-C5 | 80 | 0.8 | 4.88 | 7.22 | 2.19 | 0.09 |
| M6 | Mono-Cp(Ti)-C5 | 80 | 0.8 | 4.41 | 6.80 | 1.88 | 0.09 |
| M7 | Mono-Cp(Ti)-C5 | 95 | 0.8 | 4.20 | 10.80 | 2.30 | 0.12 |
| M8 | Mono-Cp(Ti)-C5 | 80 | 0.8 | 7.20 | 14.00 | 2.40 | 0.18 |
| | | Inventive | | | | | |
| E1 | C$_s$-Cp(Hf)-Me$_2$ | 109 | 11.9 | 6.98 | 10.95 | 2.49 | 0.06 |
| E2 | C$_s$-Cp(Hf)-Me$_2$ | 109 | 11.4 | 7.27 | 10.38 | 2.21 | 0.05 |

TABLE 1-continued

Sample Identity and Reaction Conditions

| Ex. | Catalyst Precursor | Temp. (° C.) | Press. (MPa) | Feed ethylene (wt %) | Feed propylene (wt %) | Feed ENB (wt %) | Feed VNB (wt %) |
|---|---|---|---|---|---|---|---|
| E3 | $C_s$-Cp(Hf)-Me$_2$ | 109 | 11.4 | 6.89 | 10.90 | 2.21 | 0.05 |
| E4 | $C_s$-Cp(Hf)-Me$_2$ | 107 | 11.4 | 7.73 | 10.92 | 2.26 | 0.07 |
| E5 | $C_s$-Cp(Hf)-Me$_2$ | 117 | 11.3 | 6.00 | 8.39 | 1.67 | 0.11 |
| E6 | $C_s$-Cp(Hf)-Me$_2$ | 107 | 11.3 | 5.86 | 7.46 | 1.61 | 0.07 |
| E7 | $C_s$-Cp(Hf)-Me$_2$ | 107 | 11.5 | 5.73 | 7.70 | 1.62 | 0.07 |
| | | | Comparative | | | | |
| C1 | Mono-Cp(Ti)-Me$_2$ | 110 | 11.0 | 7.86 | 11.21 | 2.3 | 0.07 |
| C2 | Mono-Cp(Ti)-Me$_2$ | 109 | 11.3 | 6.76 | 9.70 | 2.0 | 0.06 |
| C3 | Mono-Cp(Ti)-Me$_2$ | 107 | 11.2 | 6.21 | 9.69 | 2.0 | 0.06 |
| C4 | Mono-Cp(Ti)-Me$_2$ | 106 | 11.2 | 6.23 | 9.63 | 2.0 | 0.06 |
| C5 | Mono-Cp(Ti)-Me$_2$ | 105 | 10.7 | 7.75 | 11.22 | 2.0 | 0.14 |
| C6 | Mono-Cp(Ti)-Me$_2$ | 108 | 10.7 | 7.74 | 11.04 | 2.0 | 0.14 |

TABLE 2 bEPDM in the Effluent Stream and bEPDM Monomer Derived Unit Amounts

| Example | [bEPDM] in effluent, wt % | Product C2 mol % | Product C3 mol % | Product ENB mol % | Product VNB mol % |
|---|---|---|---|---|---|
| Comparative Mitsui EP 2 221 323 | | | | | |
| M1 | 10.8 | 62.30 | 35.05 | 2.40 | 0.254 |
| M2 | 10.5 | 66.17 | 31.14 | 2.43 | 0.256 |
| M3 | 10.6 | 62.14 | 34.96 | 2.71 | 0.191 |
| M4 | 10.1 | 62.14 | 34.95 | 2.74 | 0.175 |
| M5 | 9.1 | 63.20 | 34.03 | 2.57 | 0.197 |
| M6 | 11.8 | 64.19 | 33.07 | 2.55 | 0.195 |
| M7 | 10.5 | 62.19 | 34.98 | 2.61 | 0.221 |
| M8 | 7 | 63.22 | 34.04 | 2.57 | 0.167 |
| Inventive | | | | | |
| E1 | 9.2 | 60.75 | 37.34 | 1.88 | 0.030 |
| E2 | 10.3 | 61.45 | 36.94 | 1.60 | 0.020 |
| E3 | 10.0 | 57.19 | 41.10 | 1.68 | 0.030 |
| E4 | 11.3 | 60.24 | 37.89 | 1.85 | 0.030 |
| E5 | 6.1 | 63.92 | 34.42 | 1.60 | 0.050 |
| E6 | 7.5 | 61.18 | 37.14 | 1.67 | 0.020 |
| E7 | 8 | 61.19 | 37.20 | 1.60 | 0.010 |
| Comparative | | | | | |
| C1 | 11.7 | 59.91 | 37.95 | 2.08 | 0.050 |
| C2 | 10.3 | 59.13 | 38.76 | 2.07 | 0.040 |
| C3 | 9.6 | 55.68 | 42.02 | 2.26 | 0.040 |
| C4 | 9.2 | 58.55 | 39.12 | 2.27 | 0.060 |
| C5 | 12 | 60.19 | 37.84 | 1.89 | 0.090 |
| C6 | 12.7 | 57.41 | 40.53 | 1.98 | 0.070 |

TABLE 3

Diene Amounts and Mooney of bEPDM

| Example | VNB feed mol % × 0.244 + 0.012 | C3 Regio-errors mol % | Uncured ML 1 + 4 at 125° C. calculated for M1-M8, actual for E1-E7 | Mooney MLRA 1 + 4 at125° C. |
|---|---|---|---|---|
| Comparative Mitsui EP 2 221 323 | | | | |
| M1 | 0.108 | — | 152.9 | — |
| M2 | 0.098 | — | 154.3 | — |
| M3 | 0.073 | — | 164.0 | — |
| M4 | 0.057 | — | 126.5 | — |
| M5 | 0.062 | — | 146.0 | — |
| M6 | 0.067 | — | 95.9 | — |
| M7 | 0.069 | — | 134.8 | — |
| M8 | 0.072 | — | 150.1 | — |
| Inventive | | | | |
| E1 | 0.036 | 0.88 | 82.6 | 805 |
| E2 | 0.031 | 0.94 | 66.7 | 450 |
| E3 | 0.031 | 1.07 | 84.9 | 612 |
| E4 | 0.038 | 0.90 | 94.0 | 1205 |
| E5 | 0.065 | 0.94 | 93.6 | 1390 |
| E6 | 0.048 | 0.87 | 84.2 | 1109 |
| E7 | 0.048 | 0.97 | 70.7 | 700 |
| Comparative | | | | |
| C1 | 0.038 | 2.17 | 103.4 | 1540 |
| C2 | 0.038 | 1.96 | 77.5 | 894 |
| C3 | 0.039 | 2.82 | 63.6 | 742 |
| C4 | 0.039 | 2.17 | 38.1 | 261 |
| C5 | 0.063 | 2.33 | 19.9 | 133 |
| C6 | 0.063 | 2.16 | 48.3 | 750 |

Figure 1:
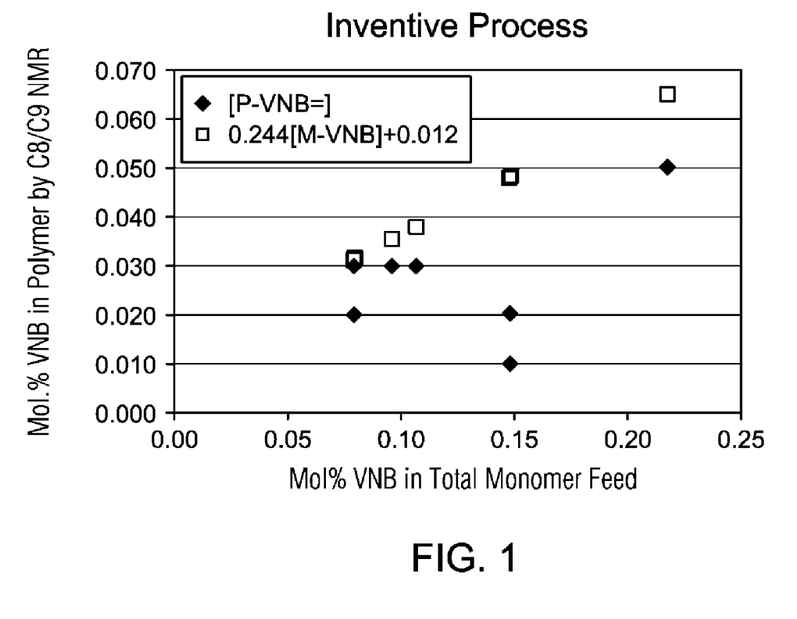
FIG. 1 is a plot of the mol percent of the VNB in the polymer as a function of the mol percent of VNB in the polymerization feed for the inventive process.
Figure 2:
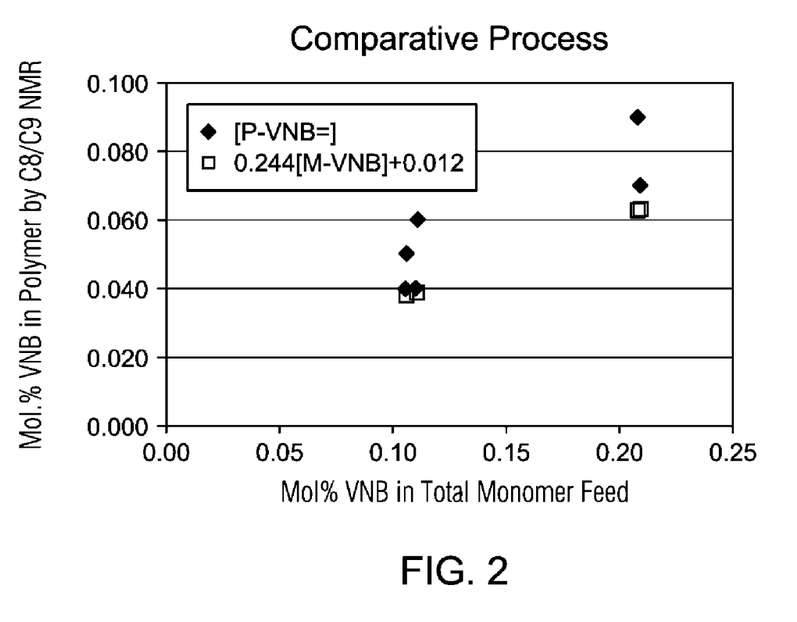
FIG. 2 is a plot of the mol percent of the VNB in the polymer as a function of the mol percent of VNB in the polymerization feed for the comparative process.

The results of polymerization testing are highlighted in the Tables 1 to 3 above, and in FIGS. 1 and 2. It can be seen that for the inventive catalyst and process, the mol percent of VNB in the feed (dual-polymerizable diene, closed diamonds) is below the desired level (represented by open squares derived from the relationship [P-DPD]<0.244[M-DPD]+0.012) (FIG. 1) which is advantageous to incorporate only a very small amount of the dual-polymerizable diene into the polymer, while that of the comparative catalyst and process is above the desired level (FIG. 2).

Polymer Testing and Compounding Examples

The polymers of examples E6 and E7 were evaluated in a standard compound formulation against several commercially available EPDM's having different degrees of branching. The polymers are compounded according to the formulation showed in Table 4.

TABLE 4

Compounding Example

| | Component | phr |
|---|---|---|
| Masterbatch | Polymer | 100 |
| | N-550 FEF carbon black | 130 |
| | Flexon ™ 876 | 70 |
| | Stearic Acid | 1 |
| | ZnO red seal | 5 |
| | Sulfur | 0.1 |

TABLE 4-continued

Compounding Example

| | Component | phr |
|---|---|---|
| Curing ingredients | Sulfur | 1 |
| | ZBEC (zinc dibenzyl dithiocarbamate, 70%) | 1.5 |
| | MBTS (2,2'-dibenzothiazole, 80%) | 1.5 |
| | Rhenocure ™ ZAT (70%) | 1.1 |
| | Rhenocure ™ TP/G (50%) | 1.8 |

The compound masterbatch was prepared in a Haake Rheomix lab mixer of 300 cm³ volume according to the following procedure: the mixer was heated to 120° C. and charged with the polymer cut in small pieces while the motor was set at 70 rpm. The compounding ingredients are then added slowly until the ingredients are ingested by the rubber as highlighted by a peak in torque. The mixer speed was then reduced to 50 rpm and the compound was mixed for 3 min. The ram was then opened and the compound was dumped after 15 sec. The compounds are allowed to cool down and the curing ingredients are added and mixed with the compound on the open mill at 80° C. The compounds were press cured at 180° C. (cure time was $Tc_{90} \times 1.4$ minute for the dumbbell pads, and $Tc_{90} \times 1.4 \times 1.5$ minute for the compression set buttons). The properties of the tested polymers are summarized in Tables 5A and 5B, where "E6" and "E7" refer to cured polymer examples from above. The term "Cpd" means "compounded polymer". $C_2$ wt % corr is the wt % ethylene corrected for the polymer diene content.

TABLE 5A

Compounding Results

| | Polym ML | MLR A | Bi | $C_2^-$ wt % | $C_2^-$ wt % corr | ENB wt % | Cpd ML | Cpd Tan δ | Green tear kNm |
|---|---|---|---|---|---|---|---|---|---|
| experimental | | | | | | | | | |
| E6 | 62.5 | 701 | 8.0 | 53.2 | 49.4 | 7.2 | 69.5 | 0.674 | 4.9 |
| E7 | 68.0 | 717 | 8.4 | 53.6 | 50.2 | 6.3 | 71.9 | 0.694 | 5.1 |
| comparative | | | | | | | | | |
| V6602 | 77.9 | 335 | 0.3 | 55.0 | 52.1 | 5.2 | 95.5 | 0.853 | 6.1 |
| V7602 | 68.5 | 240 | 0.5 | 55.2 | 51.2 | 7.2 | 88.5 | 0.85 | 5.8 |
| V8600 | 95.1 | 1292 | 7.4 | 57.5 | 52.4 | 8.9 | 81.3 | 0.675 | 6.2 |
| V7500 | 90.9 | 1182 | 6.3 | 55.5 | 52.3 | 5.7 | 80.4 | 0.663 | 6.3 |
| K 8340A | 77.5 | 514 | 4.6 | 58.0 | 54.5 | 6.0 | 88.9 | 0.765 | 5.7 |
| EPG 8850 | 78.7 | 469 | 4.1 | 55.4 | 51.1 | 7.7 | 89.3 | 0.801 | 5.4 |

TABLE 5B

Compounding Results

| | Ms $t_5$ min. | $t_{90}$ min | Avg cure rate dNm | Cure state dNm | C set 70 C. % | Tensile strength Mpa | Elong % | Tear strength kNm |
|---|---|---|---|---|---|---|---|---|
| experimental | | | | | | | | |
| E6 | 8.5 | 22.6 | 6.3 | 16.9 | 22 | 12.8 | 325 | 4.9 |
| E7 | 9.8 | 2.6 | 5.4 | 14.4 | 22 | 12.8 | 355 | 5.1 |
| comparative | | | | | | | | |
| V6602 | 9.0 | 3.0 | 5.1 | 16.4 | 23 | 12.8 | 390 | 6.1 |
| V7602 | 8.4 | 2.7 | 5.9 | 16.8 | 20 | 12.9 | 340 | 5.8 |
| V8600 | 9.5 | 2.5 | 6.2 | 15.6 | 20 | 13.5 | 325 | 6.2 |
| V7500 | 9.7 | 2.8 | 5.1 | 14.5 | 23 | 13.1 | 380 | 6.3 |
| K 8340A | 9.3 | 3.0 | 4.9 | 15.1 | 21 | 14.2 | 410 | 5.7 |
| EPG 8850 | 8.7 | 2.4 | 7.0 | 17.0 | 19 | 13.4 | 365 | 5.4 |

Vistalon™ 6602 ("V6602") and Vistalon™ 7602 ("V7602") are linear metallocene made EPDM's sold by ExxonMobil Chemical Co. Vistalon™ 8600 ("V8600") and Vistalon™ 7500 ("V7500") are bimodal-branched EPDM's made with Ziegler-Natta catalysts and sold by ExxonMobil Chemical Co. Keltan™ 8340 A ("K 8340A") and Buna™ EPG 8850 ("EPG 8850") are branched EPDM's containing some VNB as branching comonomer and made with Ziegler-Natta catalysts and sold respectively by DSM Elastomers and by Lanxess.

Polymer Mooney Viscosity (ML) was measured at (1+4 at 125° C.) according to ASTM D 1646 after polymer remassing at 140° C. The Mooney Relaxation Area (MLRA) was calculated between 1 and 100 seconds relaxation time according to the equation below:

$$A = \int_1^{t_f} M\, dt = k \int_1^{t_f} t^a dt \longrightarrow A = \frac{k}{(a+1)}[t_f^{(a+1)} - 1] \quad t_f = 100\text{ s}$$

where A=MLRA, k=intercept and a=slope (also see ASTM D 1646 for this equation). The Mooney Relaxation slope and intercept are determined using the short relaxation interval method according to ISO 289-4.

The branching index of the polymers (Bi) was determined using a RPA 2000 Rubber Processing Analyzer equipped with Large Amplitude Oscillatory Shear experimentation capability (LAOS). The branching index Bi was determined according to the method described by H. G. Burhin, C. Bailly, R. Keunings, N. Rossion, A. Leygue and H. Pawlowski, "A study of polymer architecture with FT-rheology and large amplitude oscillatory shear (LAOS)," XV$^{th}$ International Congress on Rheology: The Society of Rheology 80th Annual Meeting, Monterey (California), 2008. Bi were measured at 150° C. and +/−1000% strain at a frequency of 0.63 rad/s.

Compound Mooney viscosity was measured at (1+4 at 100° C.). Compound tan δ was measured at 80 C at a frequency of 0.3 rad/s and 14% strain. Green tear was measured on green dumbbells cut with ASTM die C. Ms $t_5$ is the Mooney scorch time expressed in min to 5 torque units increase, and $Tc_{90}$ is the time to achieve 90% of the maximum $M_H$. Cure characteristics are measured with a moving die rheometer at 180° C. and 0.5 degree arc. The average cure rate is $[(M_H-M_L)*0.9-2]/(Tc_{90}-Ts_2)$, where the cure state is the difference between $M_H$ and $M_L$ and where $Ts_2$ is the cure time to 2 torque units increase.

Compression set was tested based on ASTM 395 B and measured after 70 h at 70° C. and 25% deflection.

Tensile strength and elongation are measured based on DIN 53504 S2.

Tear strength was measured based on DIN 53507A.

Figure 3:
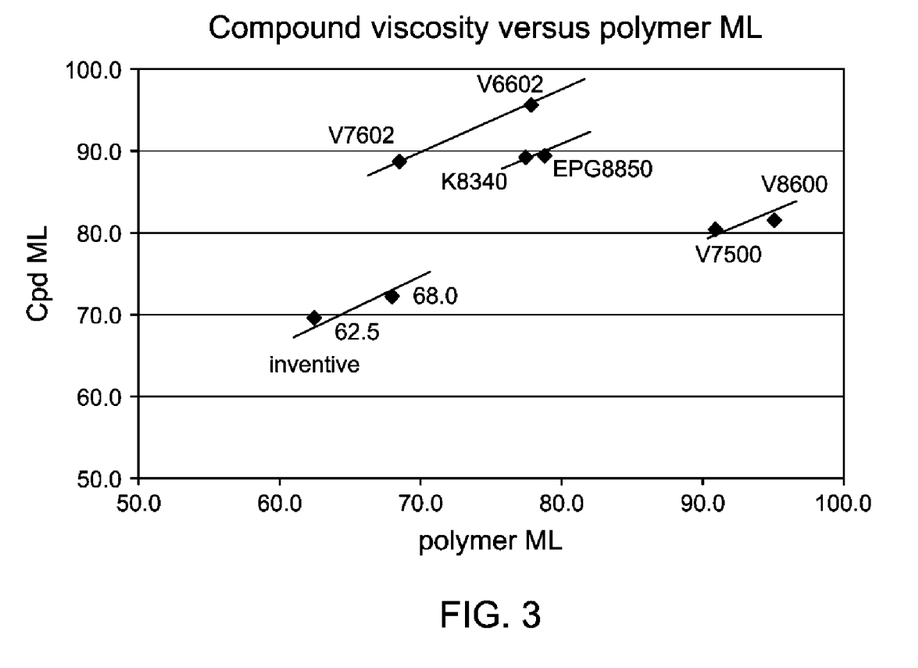
FIG. 3 is a plot of the Mooney viscosity (ML 1+4 at 100° C.) of the compounded composition versus the Mooney viscosity (ML 1+4 at 125° C.) of the inventive branched ethylene-propylene-diene elastomer.

The experimental results indicate that the polymers made according to the invention have properties comparable to better than commercially available EPDM's whilst exhibiting low compound viscosities and high elasticity as shown by low compound tan δ at low frequencies. FIG. 3 indicates that the polymers made according to the invention have a lower compound viscosity and thus exhibit a better processability than linear metallocene made EPDM's or even Ziegler-Natta made EPDM's containing VNB.

Having described and demonstrated the various aspects of the inventive process to make branched EPDMs, and the bEPDM's, described here in numbered paragraphs is:

P1. A process for making a branched ethylene-propylene-diene elastomer (bEPDM) comprising (or consisting essentially of, or consisting of) combining a catalyst precursor and an activator at a temperature within a range from 90, or 100, or 110° C. to 130, or 140, or 150, or 160° C. in solution with a feed comprising ethylene, a C3 to C12 α-olefin, a non-conjugated diene, and a dual-polymerizable diene (DPD, preferably 5-vinyl-2-norbornene and C8-C12 alpha-omega linear dienes); where the catalyst precursor is selected from the group consisting of $C_s$-symmetric Group 4 metallocenes comprising any two ligands selected from cyclopentadienyl ligands and ligands isolobal to the cyclopentadienyl group.

P2. The process of previous numbered paragraph 1, wherein the ligands isolobal to the cyclopentadienyl group are selected from indenyl, fluorenyl, cyclopenta[b]naphthalenyl, cyclopenta[a]naphthalenyl, cyclopenta[l]phenanthrenyl, cyclopenta[b]anthracenyl, cyclopenta[a]anthracenyl, indeno[1,2-b]anthracenyl, dibenzo[b,h]fluorenyl, benzo[b]fluorenyl, hydrogenated versions thereof (e.g., 4,5,6,7-tetrahydroindenyl, 1,2,3,4,5,6,7,8-octahydrofluorenyl), substituted versions thereof (e.g., 2,7-di-t-butylfluorenyl, 3,6-dimethylfluorenyl), and heterocyclic versions thereof (e.g., cyclopenta[b]thiophenyl, benzo [b]cyclopenta[d]thiophene).

P3. The process of paragraphs 1 or 2, wherein at least one of the two ligands is mono- or di-substituted with groups selected from C1 to C12 alkyls, C3 to C16 isoalkyl (sec- and tert-), C6 to C24 aryls, C9 to C24 fused multi-ring aryls (e.g., naphthyl, fluorenyl), C5 to C20 nitrogen and/or sulfur heterocycles (e.g., N-carbazyl), and combinations thereof.

P4. The process of any one of the previous numbered paragraphs, wherein at least one of the two ligands is mono- or di-substituted with groups selected from iso-propyl, iso-butyl, tert-butyl, phenyl, alkylphenyl, and dialkylphenyl.

P5. The process of any one of the previous numbered paragraphs, wherein the catalyst precursor is selected from $C_s$-symmetric ansa-metallocenes.

P6. The process of numbered paragraph 5, wherein the bridging group comprises at least one phenyl group, alkyl substituted phenyl group, or silyl substituted phenyl group.

P7. The process of any one of the previous numbered paragraphs, wherein the activator comprises a tetra(perfluorinated aromatic)borate; preferably anions selected from tetra(pentafluorophenyl)borate, tetra(perfluorobiphenyl)borate, tetra(perfluoronaphthyl)-borate, and combinations thereof.

P8. The process of numbered paragraph 7, wherein the activator also comprises a bulky organic cation (trialkyl ammonium, trialkylmethyl); preferably dialkylanilinium cation, or triphenylmethyl cation.

P9. A process for making a branched ethylene-propylene-diene elastomer (bEPDM) comprising (or consisting essentially of, or consisting of) combining a catalyst precursor and an activator at a temperature within a range from 90, or 100, or 110° C. to 130, or 140, or 150, or 160° C. in solution with a feed comprising ethylene, a C3 to C12 α-olefin, a non-conjugated diene, and a dual-polymerizable diene (DPD, preferably 5-vinyl-2-norbornene and C8-C12 alpha-omega linear dienes); where the catalyst precursor is selected from the following structures:

-continued wherein: M is a Group 4 metal, preferably zirconium or hafnium, most preferably hafnium; Q is silicon or carbon; R' and R" are selected from phenyl, alkyl substituted phenyl, and silyl substituted phenyl, most preferably C1 to C5 alkylsilyl-p-phenyl; each X is independently selected from C1 to C10 alkyls, phenyls, and halogens; each of $R^1$ to $R^8$ is independently selected from hydrogen, C1 to C10 alkyls, phenyls, and alkylphenyls; most preferably $R^1$, $R^3$ to $R^6$, and $R^8$ are hydrogen and the $R^2$ and $R^7$ groups are selected from iso-propyl, iso-butyl, tert-butyl, phenyl, alkylphenyl, and dialkylphenyl; and each of $R^{1'}$ to $R^{6'}$ is independently selected from hydrogen, C1 to C10 alkyls, and phenyls.

P10. The process of Paragraph 9, wherein the catalyst precursor is selected from:

wherein: M is a Group 4 metal, preferably zirconium or hafnium, most preferably hafnium; Q is silicon or carbon; R' and R" are selected from phenyl, alkyl substituted phenyl, and silyl substituted phenyl, most preferably C1 to C5 alkylsilyl-p-phenyl; each X is independently selected from C1 to C10 alkyls, phenyls, and halogens; each of R1 to R8 is independently selected from hydrogen, C1 to C10 alkyls, phenyls, and alkylphenyls; most preferably $R^1$, $R^3$ to $R^6$, and $R^8$ are hydrogen and the $R^2$ and $R^7$ groups are selected from iso-propyl, iso-butyl, tert-butyl, phenyl, alkylphenyl, and dialkylphenyl; and each of $R^{1'}$ to $R^{6'}$ is independently selected from hydrogen, C1 to C10 alkyls, and phenyls.

P11. The process of any one of the previous numbered paragraphs, where the combining also occurs at a pressure of at least 6.0 or 8 MPa, or within a range from 6 MPa to 20 MPa.

P12. The process of any one of the previous numbered paragraphs, where the mol percent of the dual-polymerizable diene is within a range from 0.05 to 0.30 mol %, or less than 0.30, or 0.28, or 0.26 mol % relative to the other monomers.

P13. The process of any one of the previous numbered paragraphs, wherein the non-conjugated diene is 5-ethylidene-2-norbornene.

P14. The process of any one of the previous numbered paragraphs, comprising recovering an effluent comprising from 2, or 4 wt % to 12, or 14, or 16, or 20 wt % bEPDM based on the weight of the effluent.

P15. The process of any one of the previous numbered paragraphs, wherein the bEPDM is not washed for catalyst system residue (catalyst precursor and/or activator) removal in a finishing step.

P16. The process of any one of the previous numbered paragraphs, wherein the contacting takes place in two stages or two reactors to produce two bEPDMs that are combined in situ or ex situ, each bEPDM having any one or more properties of different weight average molecular weights, and different levels of short and/or long chain branching.

P17. The process of any one of the previous numbered paragraphs, satisfying the relationship [P-DPD]<0.244[M-DPD]+0.012, where [P-DPD] is the mol % of dual-polymerizable diene as measured by $^{13}$C NMR, and [M-DPD] is the mol % dual-polymerizable diene monomer relative to the total monomer in the feed to the polymerization process; preferably the DPD is VNB and the [P-VNB] is as measured by $^{13}$C NMR using the $C_8$ and $C_9$ carbons on VNB.

P18. A branched ethylene-propylene-diene elastomer (bEPDM) made by the process of any one of the previous numbered paragraphs.

P19. A branched ethylene-propylene-diene elastomer (bEPDM) comprising (or consisting essentially of, or consisting of) within the range from 35, or 40, or 45 wt % to 55, or 60, or 65 wt % ethylene derived monomer units; within the range from 2, or 4, or 6 wt % to 8, or 10, or 12 wt % of non-conjugated diene derived monomer units; and within the range from 0.060 mol % to 0.080 or 0.10 or 0.20 mol % dual-polymerizable diene derived monomer units; wherein the remainder of monomer derived units are a C3 to C12 α-olefin derived units, most preferably propylene derived units.

P20. The bEPDM of numbered paragraph 19, having a branching index (Bi) within the range from 4 or 6 to 8 or 10 or 12.

P21. The bEPDM of any one of the previous numbered paragraphs 19 to 20, having an uncured Mooney MLRA (1+4 at 125° C.) within the range from 500 or 600 or 700 MU to 1200 or 1400 or 1600 MU.

P22. The bEPDM of any one of the previous numbered paragraphs 19 to 21, having an uncured Mooney ML (1+4 at 125° C.) of less than 140 or 120 or 100 or 98 or 95 MU, or within the range from 40 or 50 MU to 75 or 85 or 95 or 98 or 100 or 120 or 140 MU.

P23. The bEPDM of any one of the previous numbered paragraphs 19 to 22, having a compound Mooney Viscosity ML (1+4 at 125° C.) of greater than 65, or 70, or within the range from 65 or 68 MU to 72 or 84 or 90 MU.

P24. The bEPDM of any one of the previous numbered paragraphs 19 to 23, having less than 2.0, or 1.8, or 1.6, or 1.4, or 1.2 mol % propylene regio-errors as measured by $^{13}$C NMR.

P25. The bEPDM of any one of the previous numbered paragraphs 19 to 24, wherein the non-conjugated diene derived unit is 5-ethylidene-2-norbornene.

P26. The bEPDM of any one of the previous numbered paragraphs 19 to 25, wherein the dual-polymerizable diene derived unit is 5-vinyl-2-norbornene.

P27. A sheet or molded article, foamed or non-foamed, comprising the bEPDM of any one of the previous numbered paragraphs 19 to 26.

Also disclosed is the use of a catalyst precursor and an activator at a temperature within a range from 90, or 100, or 110° C. to 130, or 140, or 150, or 160° C. with ethylene, a C3 to C12 α-olefin, a non-conjugated diene, and a dual-polymerizable diene (preferably 5-vinyl-2-norbornene and C8-C12 alpha-omega linear dienes) to form a bEPDM; where the catalyst precursor is selected from the group consisting of $C_s$-symmetric Group 4 metallocenes comprising any two ligands selected from cyclopentadienyl ligands and ligands isolobal to the cyclopentadienyl group.

Also disclosed is the use of a catalyst precursor selected from the group consisting of $C_s$-symmetric Group 4 metallocenes comprising any two ligands selected from cyclopentadienyl ligands and ligands isolobal to the cyclopentadienyl group to effect a polymerization at a temperature within a range from 90, or 100, or 110° C. to 130, or 140, or 150, or 160° C. between ethylene, a C3 to C12 α-olefin (preferably propylene), a non-conjugated diene, and a dual-polymerizable diene (preferably 5-vinyl-2-norbornene and C8-C12 alpha-omega linear dienes) to form a bEPDM as described herein.

For all jurisdictions in which the doctrine of "incorporation by reference" applies, all of the test methods, patent publications, patents and reference articles are hereby incorporated by reference either in their entirety or for the relevant portion for which they are referenced.

What is claimed is:

1. A process comprising combining a catalyst precursor and an activator at a temperature within a range from 90° C. to 160° C. and a pressure greater than 8.0 MPa with a feed comprising ethylene, a C3 to C12 α-olefin, a non-conjugated diene, and a dual-polymerizable diene; and obtaining a branched ethylene propylene diene elastomer (bEPDM); where the catalyst precursor is of the following structure selected from one of the following structures:

wherein:
M is a Group 4 metal;
Q is silicon;
R' and R" are each triethylsilyl-p-phenyl;
each X is independently selected from C1 to C10 alkyls, phenyls, and halogens;
each of $R^4$ and $R^5$ are is independently selected from hydrogen, C1 to C10 alkyls, phenyls, and alkylphenyls, $R^2$ and $R^7$ are each tert-butyl, $R^1$, $R^3$ to $R^6$, and $R^8$ are each hydrogen; and
$R^{1'}$ to $R^{4'}$ are each hydrogen; and
wherein the activator comprises a tetra(perfluorinated aromatic)borate.

2. The process of claim 1, wherein the activator also comprises a bulky organic cation.

3. The process of claim 1, where the combining occurs at a pressure of at least 11.3 MPa.

4. The process of claim 1, where the mol percent of the dual-polymerizable diene is less than 0.30 mol % relative to the other monomers in the feed.

5. The process of claim 1, wherein the non-conjugated diene is 5-ethylidene-2-norbornene.

6. The process of claim 1, further comprising recovering an effluent comprising from 2 wt % to 20 wt % bEPDM based on the weight of the effluent.

7. The process of claim 1, satisfying the relationship [P-DPD]<0.244[M-DPD]+0.012, where [P-DPD] is the mol % of dual-polymerizable diene as measured by $^{13}$C NMR, and [M-DPD] is the mol % dual-polymerizable diene monomer relative to monomers in the feed.

8. The process of claim 1, wherein the bEPDM has less than 2.0 mol % propylene regio-errors as measured by $^{13}$C NMR.

* * * * *